(12) United States Patent
Sone et al.

(10) Patent No.: US 9,533,420 B2
(45) Date of Patent: Jan. 3, 2017

(54) LINK ACTUATION DEVICE

(71) Applicants: Keisuke Sone, Hamamatsu (JP); Hiroshi Isobe, Iwata (JP); Yukihiro Nishio, Iwata (JP)

(72) Inventors: Keisuke Sone, Hamamatsu (JP); Hiroshi Isobe, Iwata (JP); Yukihiro Nishio, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/937,117

(22) Filed: Nov. 10, 2015

(65) Prior Publication Data

US 2016/0059426 A1 Mar. 3, 2016

Related U.S. Application Data

(63) Continuation of application No. PCT/JP2014/062573, filed on May 12, 2014.

(30) Foreign Application Priority Data

May 16, 2013 (JP) ................. 2013-103920

(51) Int. Cl.
*B25J 11/00* (2006.01)
*B25J 17/00* (2006.01)
(Continued)

(52) U.S. Cl.
CPC ............ *B25J 17/00* (2013.01); *B25J 9/0048* (2013.01); *B25J 19/0025* (2013.01)

(58) Field of Classification Search
CPC .......... F16H 19/08; F16H 37/14; F16H 21/46; B25J 9/0048; B25J 9/102; B25J 17/0266; B25J 9/1623
(Continued)

(56) References Cited

U.S. PATENT DOCUMENTS 9,073,204 B2   7/2015 Isobe et al.
2005/0199085 A1*  9/2005 Isobe .................. B25J 9/0048
                                              74/490.05
(Continued)

FOREIGN PATENT DOCUMENTS

CN   1878640 A   12/2006
CN   102892559 A   1/2013
(Continued)

OTHER PUBLICATIONS

International Preliminary Report on Patentability dated Nov. 26, 2015 in corresponding International Patent Application No. PCT/JP2014/062573.
(Continued)

*Primary Examiner* — William Kelleher
*Assistant Examiner* — Zakaria Elahmadi (57) ABSTRACT

A distal end side link hub is connected to a proximal end side link hub via three or more link mechanisms such that alteration in posture of the distal end side link hub is allowed. Each of the link mechanisms includes a proximal side end link member, a distal side end link member, and an intermediate link member. A line member is disposed between the link hubs, two ends of the line member being held at line member holding points which are on link hub central axes, respectively. In a state where the link hubs are parallel to each other, when the distance from a midpoint to each spherical link center is defined as (D) and the distance from each spherical link center to its corresponding line member holding point is defined as (H), the relationship $H=0.5 \times D$ is established.

4 Claims, 9 Drawing Sheets (51) Int. Cl.
*B25J 9/00* (2006.01)
*B25J 19/00* (2006.01)

(58) Field of Classification Search
USPC ..... 74/89.14, 471 R, 490.05; 901/15, 28, 41, 901/19
See application file for complete search history.

(56) References Cited

U.S. PATENT DOCUMENTS

| | | |
|---|---|---|
| 2008/0028881 A1 | 2/2008 | Sone et al. |
| 2012/0043100 A1* | 2/2012 | Isobe ................ A61B 17/1631 173/42 |
| 2013/0055843 A1* | 3/2013 | Isobe ...................... F16C 1/02 74/490.04 |
| 2014/0224046 A1* | 8/2014 | Isobe .................... B25J 9/0048 74/89.14 |
| 2014/0305244 A1* | 10/2014 | Yamada .................. F16H 21/46 74/479.01 |
| 2015/0088308 A1* | 3/2015 | Isobe .................... B25J 9/0048 700/245 |
| 2016/0008977 A1* | 1/2016 | Nishio ...................... B25J 9/06 700/262 |

FOREIGN PATENT DOCUMENTS

| | | |
|---|---|---|
| JP | 2005-127475 | 5/2005 |
| JP | 2005-351379 | 12/2005 |
| JP | 2013-068280 | 4/2013 |

OTHER PUBLICATIONS

Chinese Office Action dated Jul. 14, 2016 in corresponding Chinese Patent Application No. 201480026764.6.
International Search Report mailed Jun. 3, 2014 in corresponding international application PCT/JP2014/062573.

* cited by examiner

LINK ACTUATION DEVICE

CROSS REFERENCE TO THE RELATED APPLICATION

This application is a continuation application, under 35 U.S.C. §111(a) of international application No. PCT/JP2014/062573, filed May 12, 2014, which claims priority to Japanese Patent Application No. 2013-103920, filed May 16, 2013, the entire disclosure of which is herein incorporated by reference as a part of this application.

BACKGROUND OF THE INVENTION

Field of the Invention

The present invention relates to a link actuation device that is used in a mechanism part for speedily and precisely performing, over a wide range, operations such as handling of articles and complex processing in a three-dimensional space in a robot joint portion and an industrial machine, for example.

Description of Related Art

A link actuation device has been known in which a proximal end side link hub and a distal end side link hub are connected to each other by means of three or more trinodal chain link mechanisms each composed of four revolute pairs. The link actuation device having this configuration can precisely alter the posture of the distal end side link hub relative to the proximal end side link hub over a wide operation range, while the link actuation device is compact in size. In addition, in the link actuation device having this configuration, space is formed inside the arrangement of each link mechanism, and thus, a line member which connects the proximal end side and the distal end side can be inserted in this space. For example, Patent Document 1 suggests that a line member such as an air hose, a wire for transmission of torque and rotation, and an electric wire is inserted into the space inside the link mechanism. According to this suggestion, the line member is prevented from being twisted even when the bending direction of the line member is changed.

RELATED DOCUMENT

Patent Document

Patent Document 1: JP Laid-open Patent Publication No. 2005-127475

However, when the line member is inserted into the space inside each link mechanism, the line member may be damaged by interfering with members that form the link mechanism. In addition, when the distal end side link hub alters its posture relative to the proximal end side link hub, and accordingly, the distance between line member holding portions on the proximal end side and the distal end side change, each line member holding portion causes tension and compressive force on the line member. This may damage the line member and reduce the durability thereof. On the other hand, when the counterforce to the compressive force and the tension of the line member acts on the link mechanism, burden on an actuator which actuates the link actuation device is increased.

SUMMARY OF THE INVENTION

An object of the present invention is to provide a link actuation device which is operable in a precise and wide operation range, without damaging the line member inserted in the space inside each link mechanism while it is compact in size, and can suppress increase of burden on the device caused in association with bending of the line member.

A link actuation device of the present invention will be described using reference numerals that are used in embodiments. A link actuation device 1 of the present invention includes: a proximal end side link hub 2; a distal end side link hub 3; and three or more link mechanisms 4 which connect the distal end side link hub 3 to the proximal end side link hub 2 such that alteration in posture of the distal end side link hub 3 is allowed. Each of the link mechanisms 4 includes: a proximal side end link member 5, one end of the proximal side end link member 5 being rotatably connected to the proximal end side link hub 2; a distal side end link member 6, one end of the distal side end link member 6 being rotatably connected to the distal end side link hub 3; and an intermediate link member 7 whose two ends are rotatably connected to the other ends of the proximal side end link member 5 and the distal side end link member 6, respectively. Each of the link mechanisms 4 has such a shape that a geometric model of the link mechanism 4 depicted in straight lines shows symmetry between a proximal end side portion thereof and a distal end side portion thereof with respect to an intermediate portion of the intermediate link member 7.

In this link actuation device 1, central axes of revolute pairs between the link hub 2 and the end links 5 connected to the link hub 2 cross each other, and central axes of revolute pairs between the link hub 3 and the end links 6 connected to the link hub 3 cross each other. These intersections are referred to as spherical link centers P1, P2. In a state where the proximal end side link hub 2 and the distal end side link hub 3 are parallel to each other, an axis that extends through the spherical link center P1 (P2) of the link hub 2 (3) toward the spherical link center P2 (P1) of the link hub 3 (2) is referred as a link hub central axis B (C). In this case, between the proximal end side link hub 2 and the distal end side link hub 3, a line member 33 is disposed whose two ends are held at a proximal end side line member holding point Q1 and a distal end side line member holding point Q2. The proximal end side line member holding point Q1 is on the proximal end side link hub central axis B and is located on the farther side from the spherical link center P2 opposed to the spherical link center P1, relative to the spherical link center P1 which the link hub central axis B passes. The distal end side line member holding point Q2 is on the distal end side link hub central axis C and is located on the farther side from the spherical link center P1 opposed to the spherical link center P2, relative to the spherical link center P2 which the link hub central axis C passes. In a state where the proximal end side link hub 2 and the distal end side link hub 3 are parallel to each other, when the distance from a midpoint O of the proximal end side spherical link center P1 and the distal end side spherical link center P2 to each of the spherical link centers P1 and P2 is defined as D, and the distance from the proximal end side spherical link center P1 to the proximal end side line member holding point Q1, and the distance from the distal end side spherical link center P2 to the distal end side line member holding point Q2 are each defined as H, the relationship $$H = 0.5 \times D$$

is established.

In this configuration, bending movement may have two bending centers which are the proximal end side spherical link center P1 and the distal end side spherical link center P2. Thus, compared with a general configuration having one bending center, this configuration has a greater bending radius R of the line member 33 inserted in the space 9 inside each link mechanism 4, and has a smaller change in length (L/S) of the line member 33 caused by bending of the distal end side link hub central axis C relative to the proximal end side link hub central axis B. In particular, by setting the position of the line member holding point Q1, Q2 so as to satisfy H=0.5×D, the relative displacement between the line member 33 and the line member holding point Q1, Q2 is rendered to be minimum. This makes it easy to prevent the line member 33 from interfering with other members of the link mechanism 4. Moreover, tension and compressive force on the line member 33 are reduced, and durability of the line member 33 is increased.

For example, in a case where the line member 33 is a wire to a tool mounted on the distal end side link hub 3, even when the proximal end side link hub central axis B and the distal end side link hub central axis C are bent relative to each other, the change in length of the line member 33 is extremely small, and thus, the line member 33 can be installed in the space 9 inside each link mechanism 4, without having an excess length. Accordingly, for installation, it is sufficient that the line member 33 has a length corresponding to the length when it is straight. Further, it is not necessary to provide a slide mechanism for taking measures against a great change in length of the line member 33 caused in association with its bending, and thus, installation of the line member 33 to the link actuation device 1 is easy. Since the line member 33 is accommodated in the space 9 inside each link mechanism 4, the link actuation device 1 can be installed in reduced space. Further, since the line member 33 is accommodated in the space 9 inside each link mechanism 4, the line member 33 is advantageously protected. In addition, the length of the line member 33 can be made short, and thus, costs can be reduced.

In the link actuation device 1 of the present invention, preferably, when a minimum bending radius of the line member 33 is defined as Rmin, and a maximum bending angle of the distal end side link hub central axis C relative to the proximal end side link hub central axis B is defined as (2×θmax), the relationship $$R\text{min}=D\times(1/\sin\theta\text{max}+1/(2\times\tan\theta\text{max}))$$

is established.

According to this feature, irrespective of the magnitude of the bending angle (2×θ) of the distal end side link hub central axis C relative to the proximal end side link hub central axis B, the bending radius R of the line member 33 inserted in the space 9 inside each link mechanism 4 is always within an allowable bending radius. The distance D from the midpoint O of the spherical link centers P1 and P2 to each of the spherical link centers P1 and P2 is set at the minimum value that is necessary for obtaining the maximum bending angle (2×θmax) desired for the link actuation device 1. In other words, with the dimensions of the device limited, the maximum bending angle (2×θ) can be obtained. Therefore, the link actuation device 1 can be made compact in size.

In the link actuation device 1 of the present invention, the line member 33 may be an optical fiber. An optical fiber is flexible and is used as a laser transmission cable for laser processing, a signal cable for a sensor, or the like. When the optical fiber is used, it is necessary to secure an allowable bending radius and to avoid twist and kink, and thus, caution is required in handling the optical fiber. If a laser head or a sensor is installed at the distal end side link hub 3 of the link actuation device 1 and the optical fiber is inserted through the center of the space 9 inside the link mechanism 4, exposure of the optical fiber to the outside of the link actuation device 1 is prevented, and therefore, installation space for the link actuation device 1 can be made compact.

In the link actuation device 1 of the present invention, the line member 33 may be a flexible shaft capable of transmitting torque, one end of the line member 33 may be connected to an output shaft 67a of a rotation actuator 67 installed in the proximal end side link hub 2, and the other end of the line member 33 may be connected to a rotation axis portion 61b of a rotatable mount 61 which is rotatably installed on the distal end side link hub 3.

According to this feature, the rotatable mount 61 can be rotated easily and in saved space, in a state where the counterforce caused by deformation of the flexible shaft is suppressed. When the counterforce of the flexible shaft is suppressed, the output of the rotation actuator 67 which drives the link actuation device 1 can be reduced, and thus, the weight of the entirety of the device can be reduced. Accordingly, the device can be made compact in size, and thus, costs can be reduced.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
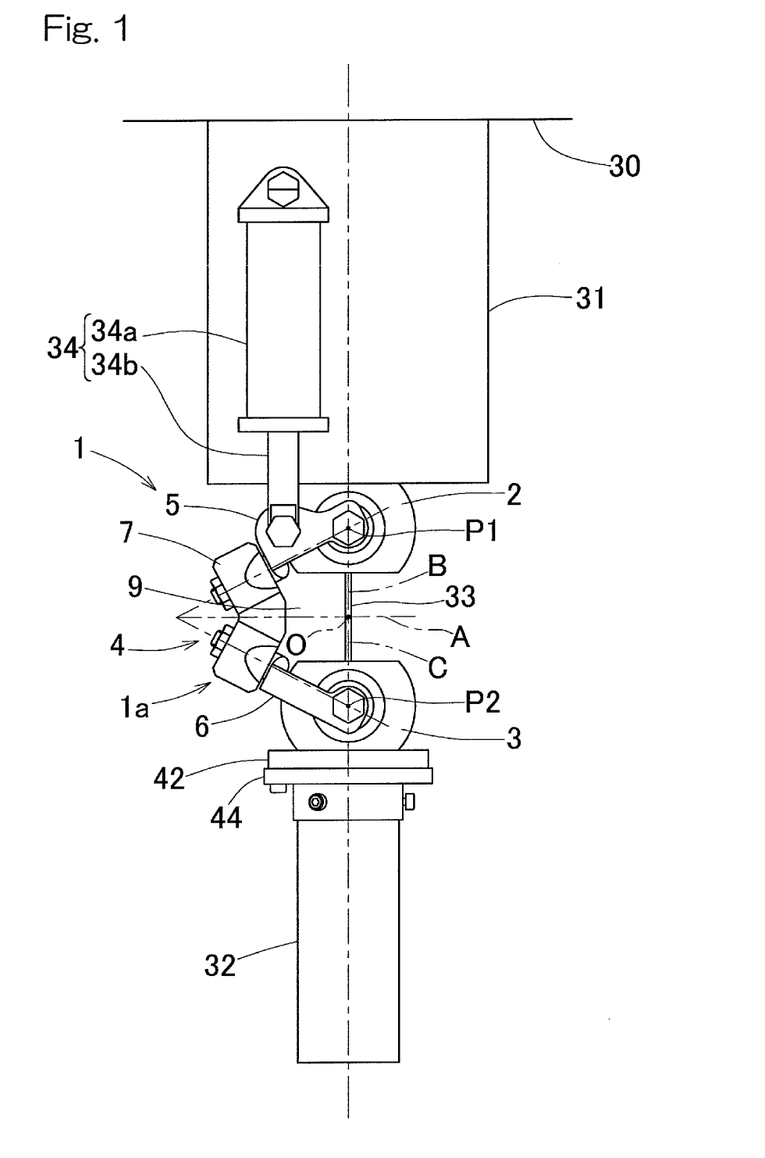
FIG. 1 is a front view showing a use state of a link actuation device according to a first preferred embodiment of the present invention, with a portion thereof omitted.

A link actuation device according to a first preferred embodiment of the present invention will be described with reference to FIG. 1 to FIG. 6. FIG. 1 shows a use state of the link actuation device. As shown in FIG. 1, in this link actuation device 1, the proximal end side thereof, which is the upper side, is mounted to a mounting base 31 installed on a ceiling surface 30; and to the distal end side thereof, which is the lower side, a work device 32 is mounted. In the present embodiment, the work device 32 is a laser processing head. To this laser processing head, a laser beam from a laser oscillator (not shown) installed outside the link actuation device 1 is sent via a line member 33 which is composed of an optical fiber. The mounting base 31 is provided with a linear motion actuator 34 which drives the link actuation device 1.

Figure 2:
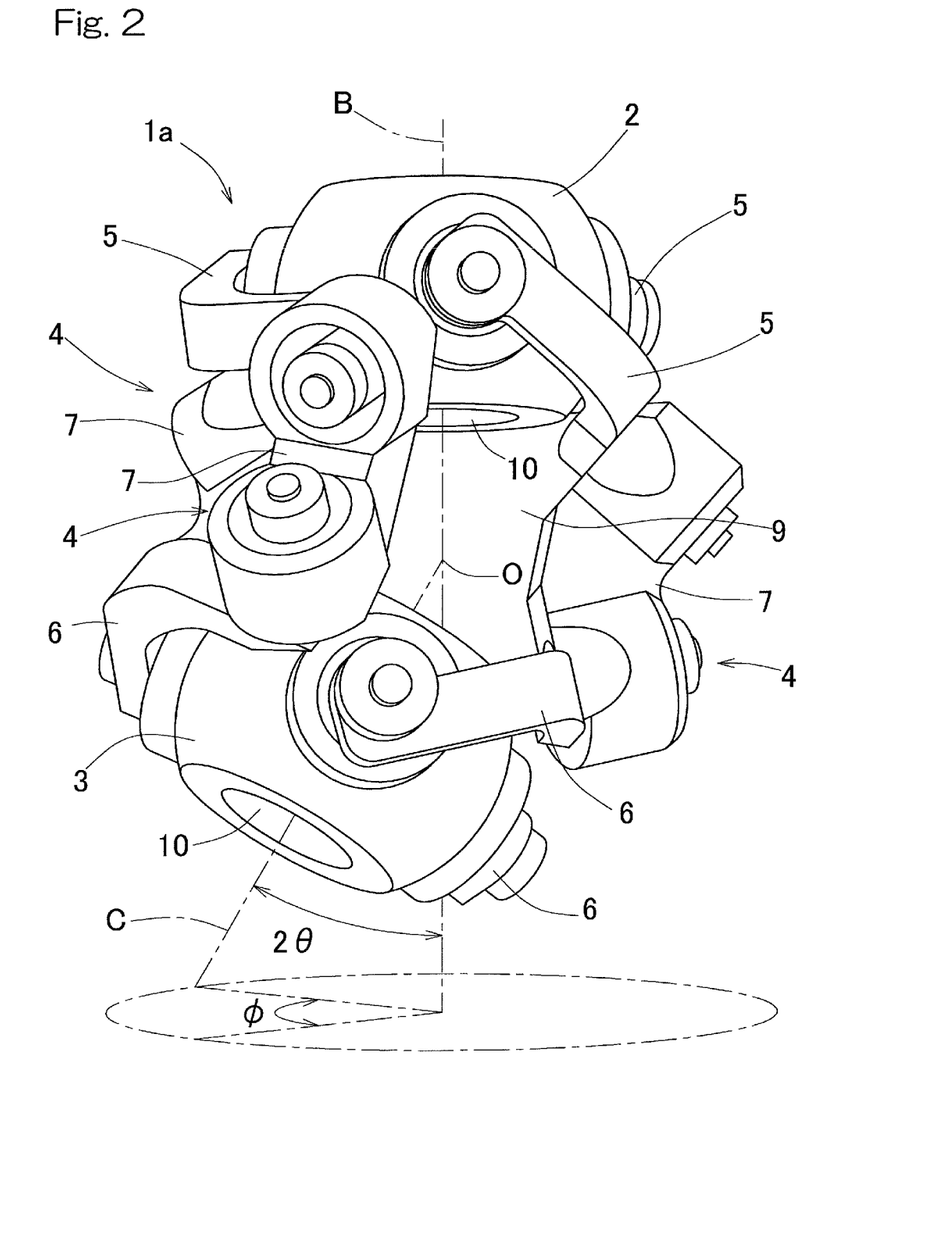
FIG. 2 is a perspective view showing a three-dimensional representation of a link actuation device body of the link actuation device.

FIG. 2 is a perspective view showing a three-dimensional representation of a link actuation device body 1a of the link actuation device 1. The link actuation device body 1a is of a type in which a distal end side link hub 3 is connected to a proximal end side link hub 2 via three link mechanisms 4 such that alteration in posture of the distal end side link hub 3 is allowed. The number of the link mechanisms 4 may be three or more, and is not limited to three. FIG. 1 shows only one link mechanism 4.

As shown in FIG. 2, each link mechanism 4 includes a proximal side end link member 5, a distal side end link member 6, and an intermediate link member 7, and forms a trinodal chain link mechanism including four revolute pairs. The proximal side end link member 5 and the distal side end link member 6 cooperate together to have an L-shape. The proximal ends of the proximal side end link members 5 and the proximal ends of the distal side end link members 6 of the link mechanisms 4 are rotatably connected to the spherical outer peripheral surfaces of the proximal end side link hub 2 and the distal end side link hub 3, respectively, at equal intervals in the circumferential direction thereof. The distal end of the proximal side end link member 5 and the distal end of the distal side end link member 6 are respectively rotatably connected on opposite ends of the intermediate link member 7.

Figure 3:
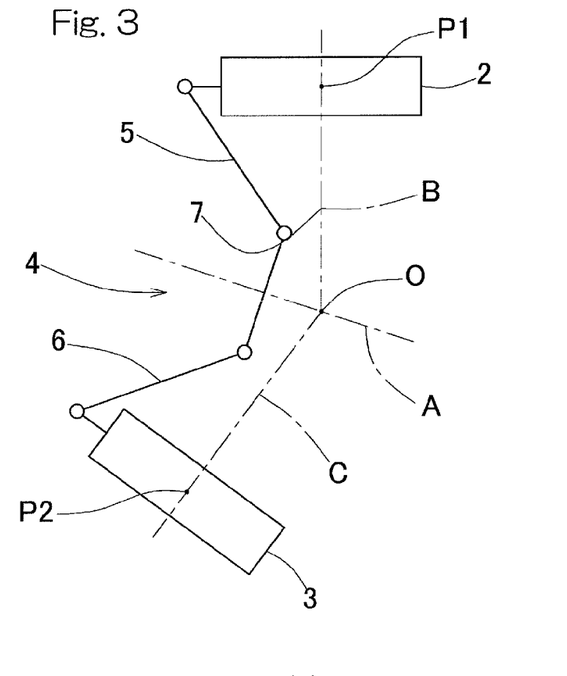
FIG. 3 is a diagram of one link mechanism of the link actuation device body depicted in straight lines.

FIG. 3 is a diagram showing one link mechanism 4 of the link actuation device body 1a depicted in straight lines. The proximal side end link member 5 and the distal side end link member 6 of each of the three link mechanisms 4 have a spherical link structure. That is, the central axes of the revolute pairs between the proximal end side link hub 2 and the proximal side end link members 5 connected to the link hub 2 cross each other at a proximal end side spherical link center P1. The central axes of the revolute pairs between the distal end side link hub 3 and the distal side end link members 6 connected to the link hub 3 cross each other at a distal end side spherical link center P2.

The distance from the proximal end side spherical link center P1 to each proximal side end link member 5 is the same. The distance from the distal end side spherical link center P2 to each distal side end link member 6 is also the same. The central axis of the revolute pair between the proximal side end link member 5 and the intermediate link member 7 and the central axis of the revolute pair between the distal side end link member 6 and the intermediate link member 7 may form an angle or may be parallel to each other.

In other words, the three link mechanisms 4 have a geometrically identical configuration. The geometrically identical configuration means that a geometric model depicted in straight lines representing the respective link members 5, 6, and 7, that is, a model depicted with the revolute pairs and lines connecting these revolute pairs represents a shape in which a proximal end side portion and a distal end side portion are symmetrical with each other with respect to an intermediate portion of the intermediate link member 7, as shown in FIG. 3.

The link mechanism 4 of the present embodiment is of a mirror symmetrical type, in which the positional relationship between a proximal end group of the proximal end side link hub 2 and the proximal side end link member 5, and distal end group of the distal end side link hub 3 and the distal side end link member 6 is in mirror symmetry relative to a symmetry plane A which is the center plane of the intermediate link member 7.

FIG. 2 and FIG. 3 each show a state where the bending angle of a distal end side link hub central axis C relative to a proximal end side link hub central axis B is a predetermined bending angle. The proximal end side link hub central axis B denotes an axis that extends through the spherical link center P1 of the proximal end side link hub 2 toward the spherical link center P2 of the distal end side link hub 3, in a state where the proximal end side link hub 2 and the distal end side link hub 3 are parallel to each other. The distal end side link hub central axis C denotes an axis that extends through the spherical link center P2 of the distal end side link hub 3 toward the spherical link center P1 of the proximal end side link hub 2, in a state where the proximal end side link hub 2 and the distal end side link hub 3 are parallel to each other.

The intersection of the proximal end side link hub central axis B and the distal end side link hub central axis C is a midpoint O of the spherical link centers P1 and P2 when the proximal end side link hub central axis B and the distal end side link hub central axis C are on the same line. Even when the posture of each link mechanism 4 changes, the distance between the proximal end side spherical link center P1 and the distal end side spherical link center P2 is always constant.

The proximal end side link hub 2, the distal end side link hub 3, and the three link mechanisms 4 cooperate together to form a two-degrees-of-freedom mechanism in which the distal end side link hub 3 is movable relative to the proximal end side link hub 2 in two axial directions perpendicular to each other. This two-degrees-of-freedom mechanism is compact in size, but can realize a wide range of movement of the distal end side link hub 3 relative to the proximal end side link hub 2. For example, the maximum bending angle, which is the maximum value of the bending angle ($2 \times \theta$) (FIG. 2) between the proximal end side link hub central axis B and the distal end side link hub central axis C, can be set at about 90°. In addition, an angle of traverse φ (FIG. 2) of the distal end side link hub 3 relative to the proximal end side link hub 2 can be set within a range of 0° to 360°.

The bending angle (2×θ) means a vertical angle formed when the central axis C of the distal end side link hub 3 is inclined relative to the central axis B of the proximal end side link hub 2. The angle of traverse φ means a horizontal angle formed when the distal end side link hub central axis C is inclined relative to the proximal end side link hub central axis B.

In this link actuation device 1, when the following three conditions 1 to 3 are satisfied, if the angular positional relationship between the intermediate link member 7 and the proximal side end link member 5 and the angular positional relationship between the intermediate link member 7 and the distal side end link member 6 are rendered to be identical with each other relative to the symmetry plane A of the intermediate link member 7 with respect to the proximal end side and the distal end side, due to geometric symmetry, the proximal end group of the proximal end side link hub 2 and the proximal side end link member 5, and the distal end group of the distal end side link hub 3 and the distal side end link member 6 will move in the same manner.

(Condition 1) In the link mechanisms 4, with respect to the proximal end side and the distal end side, an angle a (FIG. 4) between the central axes of revolute pairs of the end link members 5 (6) at the spherical link center P1 (P2) is the same with each other, and an length X (FIG. 4) from the spherical link center P1 (P2) to each end link member 5 (6) is the same with each other.

(Condition 2) The proximal side end link member 5 and the distal side end link member 6 have an identical geometrical shape.

(Condition 3) The intermediate link member 7 has an identical shape on its proximal end side and its distal end side.

For example, in a case where rotation axes are provided in the proximal end side link hub 2 and the distal end side link hub 3, coaxially with the link hub central axis B and the link hub central axis C, respectively, and rotation is transmitted from the proximal end side to the distal end side, a constant velocity universal joint is formed in which the proximal end side and the distal end side are rotated by the same angle at an equal speed.

Figure 4:
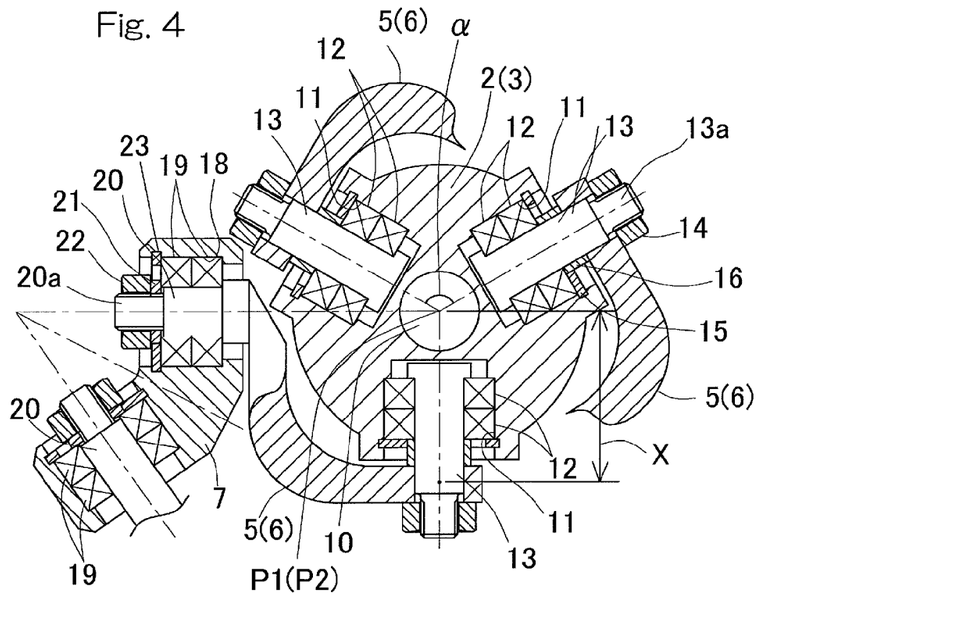
FIG. 4 is a cross-sectional view showing a configuration of each revolute pair section of the link actuation device body.

FIG. 4 is a cross-sectional view showing the revolute pair section between the proximal end side link hub 2 and the proximal side end link member 5, and the revolute pair section between the proximal side end link member 5 and the intermediate link member 7. The structure of these revolute pairs are the same as those of the revolute pair section between the distal end side link hub 3 and the distal side end link member 6 and the revolute pair section between the distal side end link member 6 and the intermediate link member 7.

In the link hub 2 (3), shaft holes 11 extending in a radial direction are formed in the outer periphery thereof at three positions in the circumferential direction thereof. A shaft member 13 is rotatably supported by two bearings 12 provided in each shaft hole 11. An outer end portion of each shaft member 13 protrudes from the link hub 2 (3) in a radially outward direction, and to a protruding screw portion 13a provided at this protruding portion, the end link member 5 (6) is coupled, and is fastened and fixed with a nut 14.

Each bearing 12 is a rolling bearing such as, for example, a deep groove ball bearing, and includes an outer ring (not shown) press-fitted in the inner periphery of the shaft hole 11 and an inner ring (not shown) press-fitted on the outer periphery of the shaft member 13. The outer ring is prevented from slipping off by a retaining ring 15. Between the inner ring and the end link member 5 (6), a spacer 16 is interposed, and thus, the fastening force of the nut 14 is transmitted to the inner ring via the end link member 5 (6) and the spacer 16, thereby applying a predetermined preload to the bearing 12.

In the revolute pair between the end link member 5 (6) and the intermediate link member 7, two bearings 19 are provided in a communication hole 18, which is one of those respectively formed on opposite ends of the intermediate link member 7, and these bearings 19 rotatably support a shaft portion 20 at the tip end of the end link member 5 (6). The bearings 19 are fastened and fixed with a nut 22 via a spacer 21.

Each bearing 19 is a rolling bearing such as, for example, a deep groove ball bearing, and includes an outer ring (not shown) press-fitted in the inner periphery of the communication hole 18, and an inner ring (not shown) press-fitted on the outer periphery of the shaft portion 20. The outer ring is prevented from slipping off by a retaining ring 23. The fastening force of the nut 22 threadedly engaged on a distal end screw portion 20a of the shaft portion 20 is transmitted to the inner ring via the spacer 21, thereby applying a predetermined preload to the bearing 19.

As described above, the bearings 12, 19 are provided in the four revolute pairs in each link mechanism 4, i.e., in the revolute pair between the proximal end side link hub 2 and the proximal side end link member 5, in the revolute pair between the distal end side link hub 3 and the distal side end link member 6, in the revolute pair between the proximal side end link member 5 and the intermediate link member 7, and in the revolute pair between the distal side end link member 6 and the intermediate link member 7. By employing this structure, the frictional resistance occurring in each revolute pair can be reduced, whereby the rotational resistance can be relieved. Accordingly, smooth power transmission can be secured, and also, the durability thereof can be increased.

In the structure provided with the bearings 12, 19, by applying a preload to the bearings 12, 19, a radial clearance and a thrust clearance are eliminated and rattling of the revolute pair can be suppressed. As a result, occurrence of vibration and abnormal sound can be suppressed. In particular, by providing the bearing clearance in each bearing 12, 19 as a negative clearance, backlash occurring between an input and an output can be reduced.

By providing each bearing 12 embedded in the proximal end side link hub 2 and the distal end side link hub 3, without enlarging the external shape of the link actuation device body 1a, the external shape of each of the proximal end side link hub 2 and the distal end side link hub 3 can be enlarged. Accordingly, the mounting space for mounting the proximal end side link hub 2 and the distal end side link hub 3 to other members can be easily secured.

As shown in FIG. 1, the linear motion actuator 34 includes a cylinder part 34a having a proximal end rotatably connected to the mounting base 31, and a piston rod 34b having a tip end rotatably connected to an intermediate portion of the proximal side end link member 5. The linear motion actuator 34 is provided in each link mechanism 4, for example. When the number of link mechanisms 4 is three, the linear motion actuator 34 may be provided in two or more link mechanisms 4. By controlling each linear motion actuator 34 to rotate the proximal side end link member 5, the posture of the distal end side link hub 3 can be altered to any posture relative to the proximal end side link hub 2.

Figure 5:
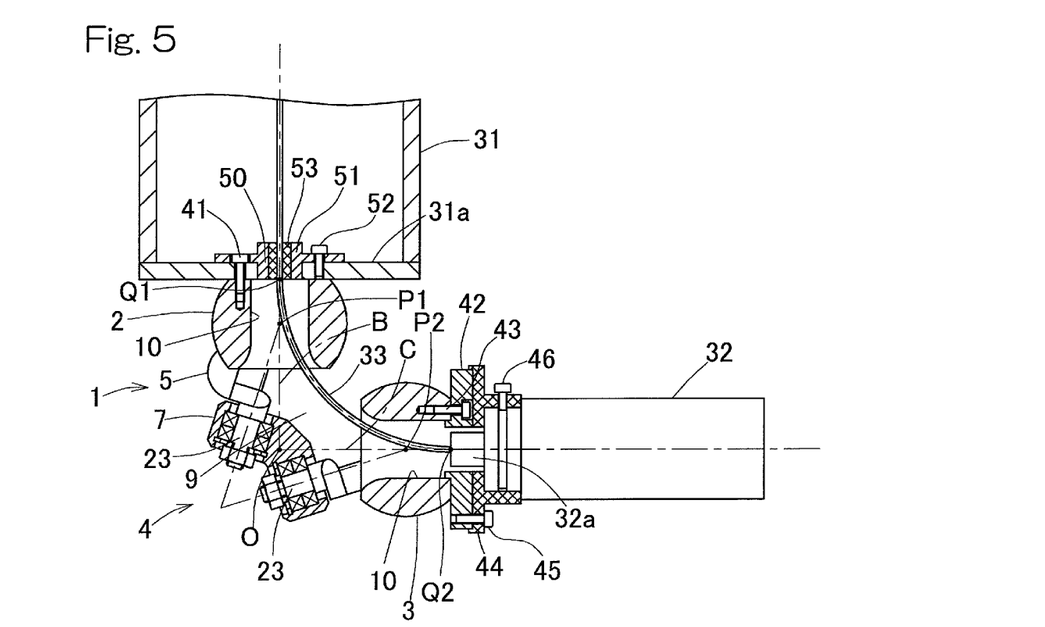
FIG. 5 is a cross-sectional view of the link actuation device.

FIG. 5 is a cross-sectional view showing a structure of a section in which the link actuation device 1 is mounted to the mounting base 31 and the work device 32. As shown in FIG.

5, the proximal end side link hub 2 is mounted to the mounting base 31 with a bolt 41, with the proximal end face of the proximal end side link hub 2 in contact with a bottom plate portion 31a of the mounting base 31. With respect to the distal end side link hub 3, a distal end plate 42 is mounted with a bolt 43 to the distal end face of the distal end side link hub 3, and a head mounting flange 44 of the work device 32 composed of a laser processing head is mounted with a bolt 45 to the distal end plate 42. The head mounting flange 44 is fixed to the work device 32 with a bolt 46.

The line member 33 composed of an optical fiber is flexible, and is disposed in a space 9 inside each link mechanism 4, in a state that the line member 33 is inserted in through-holes 10, 10 provided in the link hubs 2, 3. The central axis of each through-hole 10 is aligned with the link hub central axis B, C.

The bottom plate portion 31a of the mounting base 31 is provided with a through-hole 50 which corresponds to the through-hole 10 of the proximal end side link hub 2, and a line member holding member 51 of a tubular shape is fitted in the through-hole 50. The line member holding member 51 is fixed to the mounting base 31 with a bolt 52. An elastic member 53 of a tubular shape is fitted inside the line member holding member 51, and the line member 33 is inserted inside the elastic member 53, whereby the line member 33 is held by the line member holding member 51. The central axis of the tubular line member holding member 51 and the central axis of the tubular elastic member 53 are aligned with the proximal end side link hub central axis B.

The elastic member 53 is in close contact with the outer peripheral surface of the line member 33. The portion, covered by the elastic member 53, of the line member 33 is held in a certain state, for example, in a linear shape. The boundary point between the portion covered by the elastic member 53 of the line member 33 and the portion present in the through-hole 10 of the line member 33 defines a proximal end side line member holding point Q1. The proximal end side line member holding point Q1 is located on the proximal end side link hub central axis B and is located on the farther side from the midpoint O relative to the proximal end side spherical link center P1.

Each of the distal end plate 42 and the head mounting flange 44 has a ring shape, and in the hollow portion thereof, a line member introducing portion 32a of the work device 32 protrudes. A tip end portion of the line member 33 is inserted in the line member introducing portion 32a. The boundary point between the portion inserted in the line member introducing portion 32a of the line member 33 and the portion present in the through-hole 10 of the line member 33 defines a distal end side line member holding point Q2. The central axes of the ring-shaped distal end plate 42, the ring-shaped head mounting flange 44 and the line member introducing portion 32a are aligned with the distal end side link hub central axis C. The distal end side line member holding point Q2 is located on the distal end side link hub central axis C and is located on the farther side from the midpoint O relative to the distal end side spherical link center P2. The distance from the proximal end side spherical link center P1 to the proximal end side line member holding point Q1, and the distance from the distal end side spherical link center P2 to the distal end side line member holding point Q2 are equal to each other.

The line member 33 bends in association with actuation of the link actuation device 1. In that case, in order to prevent damage of the line member 33 and to suppress increase in burden on the link actuation device 1 caused in association with the bending of the line member 33, the dimensions of the respective portions are set as follows.

[First Settings]

In a state where the proximal end side link hub 2 and the distal end side link hub 3 are parallel to each other, when ½ of the distance between the proximal end side spherical link center P1 and the distal end side spherical link center P2 is defined as D, and the distance from the spherical link center P1 to the line member holding point Q1 and the distance from the spherical link center P2 to the line member holding point Q2 are each defined as H, the position of each of the proximal end side line member holding point Q1 and the distal end side line member holding point Q2 is set so as to be expressed by the relationship of $$H = 0.5 \times D \tag{Equation 1}$$

Figure 6:
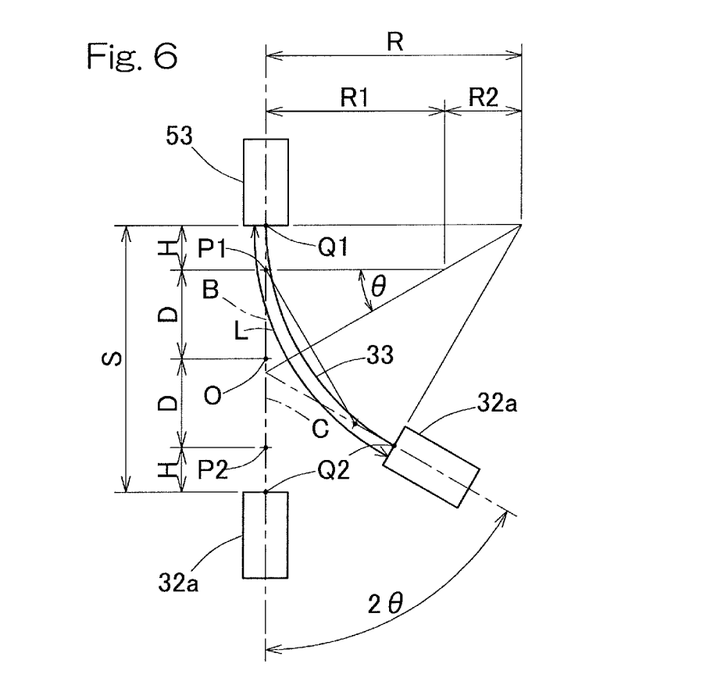
FIG. 6 is a schematic diagram showing the positional relationship between a line member and link hubs of the link actuation device.

The basis for the above relational expression (Equation 1) will be explained with reference to FIG. 6. Dimension S in FIG. 6 denotes the distance between the proximal end side line member holding point Q1 and the distal end side line member holding point Q2 in a state where the proximal end side link hub 2 and the distal end side link hub 3 are parallel to each other. Dimension D in FIG. 6 denotes the distance between the midpoint O and the spherical link center P1, P2, the midpoint O being the midpoint of the proximal end side spherical link center P1 and the distal end side spherical link center P2. Dimension H in FIG. 6 denotes the distance between the spherical link center P1, P2 and the line member holding point Q1, Q2. The relationship between dimensions S, D and H is expressed by Equation 2.

$$S = 2(D+H) \tag{Equation 2}$$

In a case where the line member 33 is assumed to be a flexible member having uniform flexural rigidity, when the distal end side link hub 3 alters its posture relative to the proximal end side link hub 2, the line member 33 is deformed into an arc shape. When the bending angle of the distal end side link hub central axis C relative to the proximal end side link hub central axis B is (2×θ), if the bending radius of the line member 33 is defined as R, and the arc length between the proximal end side line member holding point Q1 and the distal end side line member holding point Q2 is defined as L, dimensions R and L are expressed by Equation 3 and Equation 4.

$$R = R1 + R2 = D/\sin\theta + H/\tan\theta \tag{Equation 3}$$

$$L = 2R\theta \tag{Equation 4}$$

Figure 7:
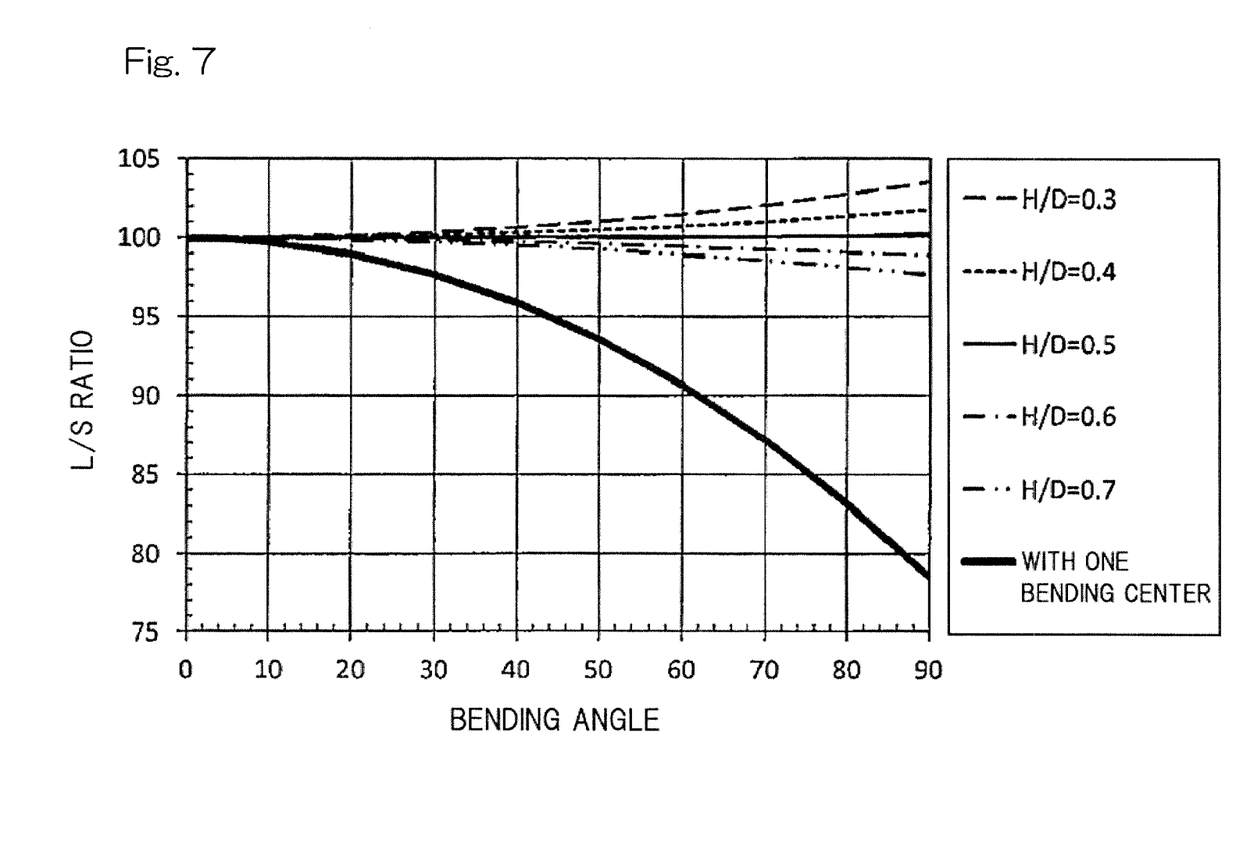
FIG. 7 is a chart showing the relationship between a bending angle of a link hub central axis and the change in length of the line member caused by actuation of the link actuation device.

FIG. 7 is a chart showing the relationship between the bending angle (2×θ) and the change in length (L/S) of the line member 33 caused by actuation of the link actuation device 1, in comparison among specifications respectively having different positions (H/D) of the line member holding points Q1, Q2.

Figure 8:
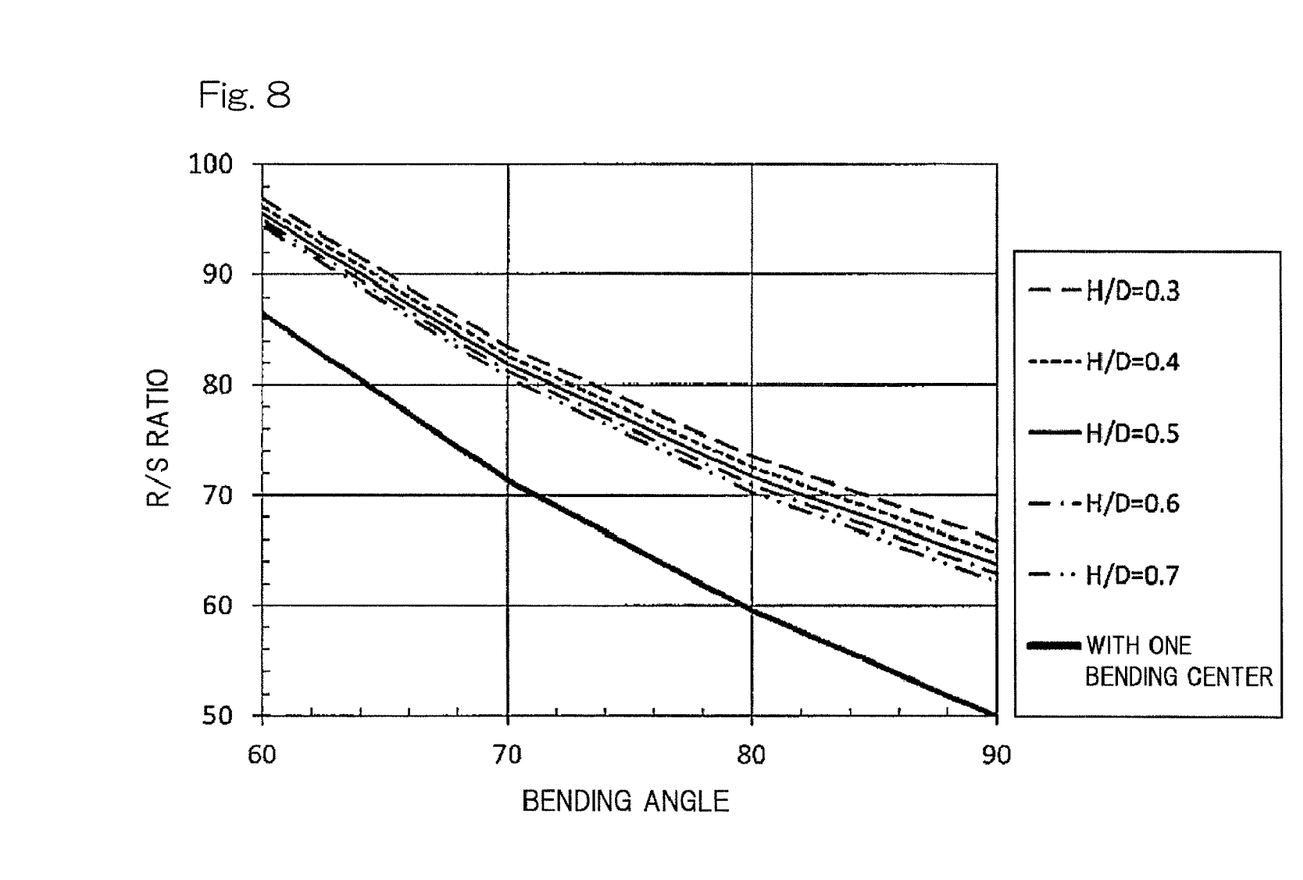
FIG. 8 is a chart showing the relationship between the bending angle of the link hub central axis and the magnitude of the bending radius of the line member caused by actuation of the link actuation device.

The change in length of the line member 33 is expressed by (L/S) which is a dimensionless quantity. FIG. 8 is a chart showing the relationship between the bending angle (2×θ) and the bending radius (R/S) of the line member 33 caused by actuation of the link actuation device 1, in comparison among specifications respectively having different positions (H/D) of the line member holding points Q1, Q2. The bending radius of the line member 33 is expressed by (R/S) which is a dimensionless quantity.

The relationships shown in FIG. 7 and FIG. 8 are obtained through calculation. For comparison with a configuration having two bending centers as in this link actuation device 1, FIG. 7 and FIG. 8 also show results of calculation conducted on a link actuation device (see FIG. 9) which bends at one point as a comparative example.

Figure 9:
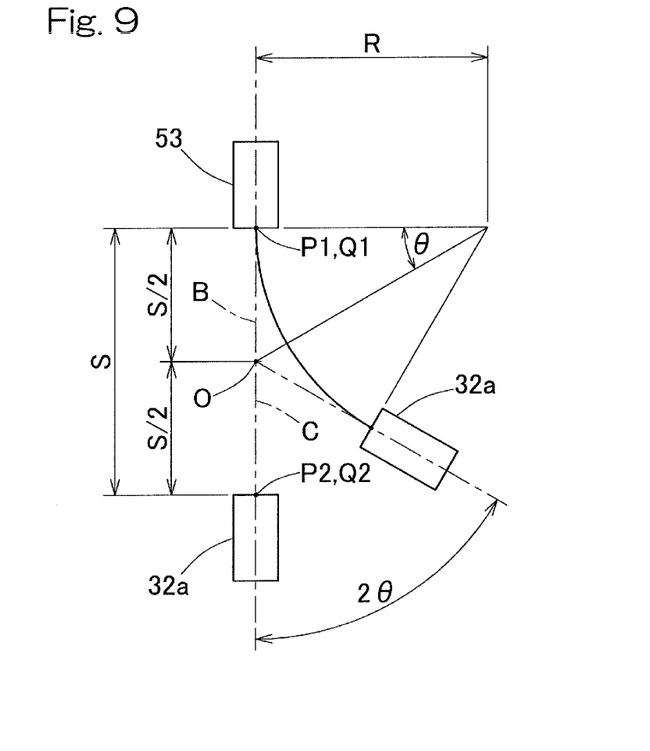
FIG. 9 is a schematic diagram showing the positional relationship between a line member and link hubs of a link actuation device as a comparative example.

As seen from FIG. 8, when the distance S between the line member holding point Q1 and line member holding point Q2 is the same, and the bending angle (2×θ) is also the same, the configuration having two bending centers (FIG. 6) has a greater bending radius R of the line member 33 than that of the configuration having one bending center (FIG. 9). In the comparison among the specifications having two bending centers, the greater the value of H/D is, that is, the farther from the spherical link center P1, P2, the position of the line member holding point Q1, Q2 is, the smaller the bending radius R of the line member 33 is. The flexible member has a lower limit in the bending radius R, whereby the bending angle (2×θ) is limited.

However, in a case where the configuration having two bending centers (FIG. 6) is compared with the configuration having one bending center (FIG. 9), when the bending angle (2×θ) is the same, the configuration having two bending centers (FIG. 6) has a greater bending radius R than that of the configuration having one bending center. Therefore, the configuration having two bending centers (FIG. 6) can have a greater bending angle (2×θ) than that of the configuration having one bending center (FIG. 9).

As seen from FIG. 7, when the distance S between the line member holding point Q1 and line member holding point Q2 is the same, and the bending angle (2×θ) is also the same, the configuration having two bending centers (FIG. 6) has a smaller change in length (L/S) of the line member 33 than that of the configuration having one bending center (FIG. 9). In the comparison among the specifications having two bending centers, when (H/D) is 0.5, the change in length (L/S) of the line member 33 is smallest.

Therefore, by setting the position of the line member holding point Q1, Q2 so as to satisfy H=0.5×D for a desired distance D, the relative displacement between the line member 33 and the line member holding portion Q1, Q2 is rendered to be minimum. This makes it easy to prevent the line member 33 from interfering with other members of the link mechanism 4. Moreover, tension and compressive force on the line member 33 are reduced, and durability of the line member 33 is increased.

As seen from FIG. 7 and FIG. 8, compared with the configuration having one bending center, the configuration having two bending centers has a greater bending radius R of the line member 33 disposed in the space 9 inside each link mechanism 4, and has a smaller change in length (L/S) of the line member 33 caused by bending of the distal end side link hub central axis C relative to the proximal end side link hub central axis B.

Therefore, in a case where the line member 33 is a wire to a tool mounted on the distal end side link hub 3 as in the present embodiment, even when the proximal end side link hub central axis B and the distal end side link hub central axis C are bent relative to each other, the change in length (L/S) of the line member 33 is extremely small. Thus, the line member 33 can be installed in the space 9 inside each link mechanism 4, without having an excess length. Accordingly, for installation, it is sufficient that the line member 33 has a length corresponding to the length when it is straight. Also, it is not necessary to provide a slide mechanism for taking measures against a great change in length of the line member 33 caused in association with its bending, and thus, installation of the line member 33 to the link actuation device 1 is easy. Since the line member 33 is accommodated in the space 9, the link actuation device 1 can be installed in saved space. Further, since the line member 33 is accommodated in the space 9, the line member 33 is advantageously protected. In addition, the length of the line member 33 can be made short, and thus, costs can be reduced.

[Second Settings]

When the minimum bending radius of the line member 33 is defined as Rmin, and the maximum bending angle of the distal end side link hub central axis C relative to the proximal end side link hub central axis B is defined as (2×θmax), settings are made such that the following relationship is satisfied.

$$R_{min} = D \times (1/\sin\theta_{max} + 1/(2\times\tan\theta_{max})) \quad \text{(Equation 5)}$$

According to this settings, irrespective of the magnitude of the bending angle (2×θ) of the distal end side link hub central axis C relative to the proximal end side link hub central axis B, the bending radius R of the line member 33 disposed in the space 9 inside each link mechanism 4 is always within an allowable bending radius. The distance D is set at the minimum value that is necessary for obtaining the maximum bending angle (2×θmax) desired for the link actuation device 1. In other words, with the dimensions of the device limited, the maximum bending angle (2×θ) can be obtained. Therefore, the link actuation device 1 can be made compact in size.

In a case where the line member 33 is an optical fiber as in the present embodiment, it is required to secure an allowable bending radius of the line member 33 and to avoid twist and kink in particular. When the dimensions of the respective portions are set as described above, change in length of the optical fiber caused in association with actuation of the link actuation device 1 is small, and thus, twist and kink can be avoided. As a result, handling of the line member 33 is improved. In addition, exposure of the optical fiber to the outside of the link actuation device 1 is prevented, and installation space for the link actuation device 1 can be made compact.

Figure 10:
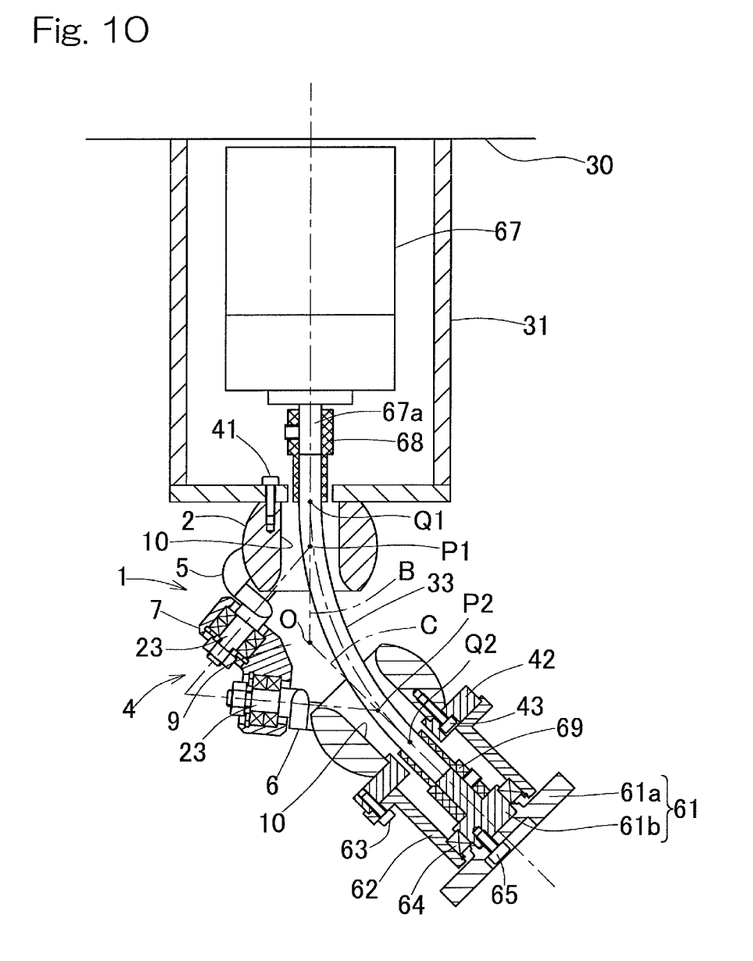
FIG. 10 is a cross-sectional view showing a use state of the link actuation device according to a second preferred embodiment of the present invention.

FIG. 10 shows a second preferred embodiment of the present invention in which the line member 33 is a flexible shaft capable of transmitting torque. The link actuation device 1 of the second embodiment supports a rotary body (not shown) such as a rotary tool such that alteration in posture of the rotary body is allowed. The proximal end side link hub 2 is fixed to the mounting base 31 with the bolt 41, and the rotary body is installed on a rotatable mount 61 which is rotatably provided on the distal end side link hub 3.

The rotatable mount 61 is supported by the distal end side link hub 3 in the following manner, for example. In the second embodiment, the distal end plate 42 is mounted with the bolt 43 to the distal end face of the distal end side link hub 3, and a rotatable mount holding flange 62 is mounted with a bolt 63 to the distal end plate 42. A rotation axis portion 61b of the rotatable mount 61 is rotatably supported by the rotatable mount holding flange 62 via a bearing 64. A rotatable mount body 61a and the rotation axis portion 61b of the rotatable mount 61 are provided as separate members, and the rotatable mount body 61a and the rotation axis portion 61b are coupled to each other with a bolt 65.

A rotation actuator 67 which drives the rotatable mount 61 to rotate is installed inside the mounting base 31. The proximal end of the line member 33 being a flexible shaft is coupled to an output shaft 67a of the rotation actuator 67 via a coupling 68. The coupling 68 has a tubular shape, which has a central axis aligned with the proximal end side link hub central axis B. The boundary point between the portion inserted in the coupling 68 and the portion present in the through-hole 10 of the proximal end side link hub 2 of the line member 33 is the proximal end side line member holding point Q1. The proximal end side line member holding point Q1 is located on the proximal end side link hub central axis B and is located on the farther side from the midpoint O relative to the proximal end side spherical link center P1.

The distal end of the line member 33 is coupled to the rotation axis portion 61b of the rotatable mount 61 via a coupling 69. The coupling 69 also has a tubular shape, which has a central axis aligned with the distal end side link hub central axis C. The boundary point between the portion inserted in the coupling 69 and the portion present in the through-hole 10 of the distal end side link 3 of the line member 33 is the distal end side line member holding point Q2. The distal end side line member holding point Q2 is located on the distal end side link hub central axis C and is located on the farther side from the midpoint O relative to the distal end side spherical link center P2. The distance from the proximal end side spherical link center P1 to the proximal end side line member holding point Q1 and the distance from the distal end side spherical link center P2 to the distal end side line member holding point Q2 are equal to each other.

Also in the second embodiment, the dimensions of the respective portions are set based on the first settings and the second settings described above. Accordingly, the rotatable mount 61 can be rotated easily and in saved space, in a state where the counterforce caused by deformation of the flexible shaft is suppressed. When the counterforce of the flexible shaft is suppressed, the output of the actuator which drives the link actuation device can be reduced, and thus, the weight of the entirety of the device can be reduced. Accordingly, the device can be made compact in size, and thus, costs can be reduced.

Figure 11:
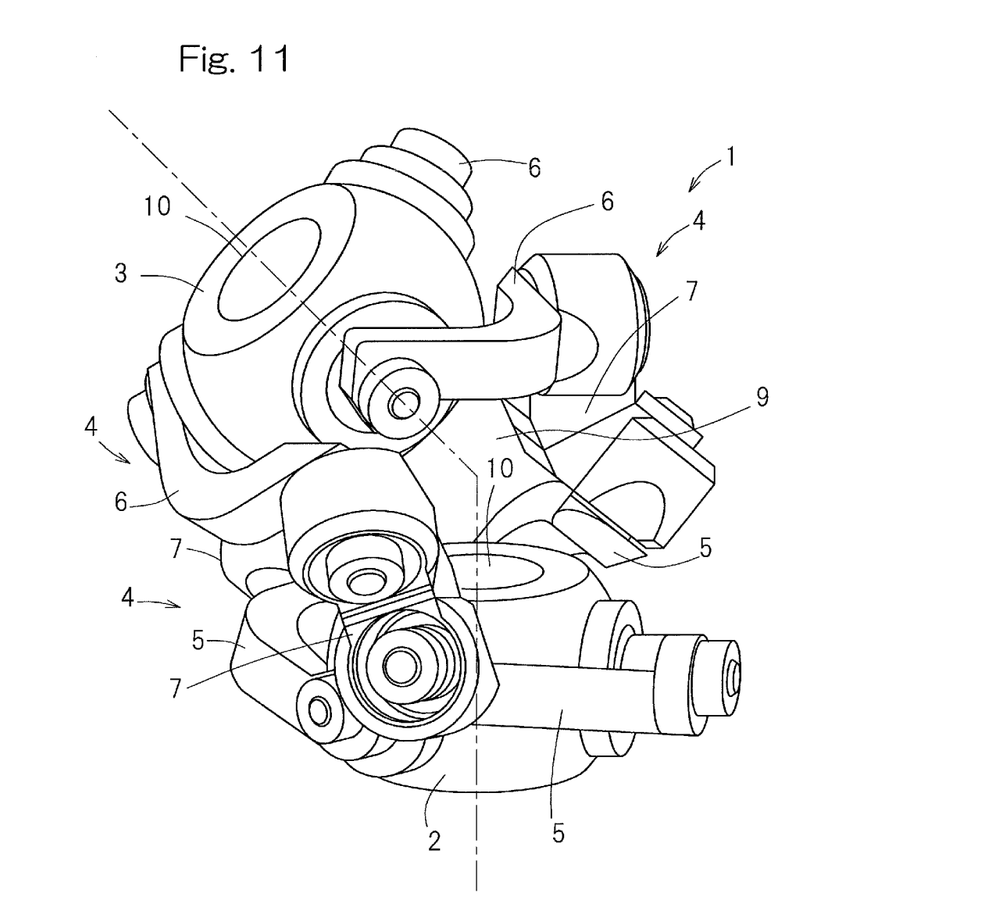
FIG. 11 is a perspective view showing a three-dimensional representation of the link actuation device body according to a third preferred embodiment of the present invention.

In the link actuation device 1 of each of the first and second embodiments, each link mechanism 4 is of a mirror symmetry type. However, as shown in a third preferred embodiment of the present invention in FIG. 11, each link mechanism 4 may be of a point symmetry type. Also in the third embodiment, by appropriately setting the dimensions of the respective portions based on the first settings and the second settings described above, the same effects as those of the mirror symmetry type can be obtained. In FIG. 11, reference numerals are given so as to correspond to those in the configuration of the mirror symmetry type.

Although the present invention has been fully described in connection with the preferred embodiments thereof with reference to the accompanying drawings, numerous additions, modifications and omissions can be made without departing from the gist of the present invention. Accordingly, such additions, modifications and omissions are to be construed as included in the scope of the present invention.

REFERENCE NUMERALS

1 . . . link actuation device
2 . . . proximal end side link hub
3 . . . distal end side link hub
4 . . . link mechanism
5 . . . proximal side end link member
6 . . . distal side end link member
7 . . . intermediate link member
33 . . . line member
61 . . . rotatable mount
61b . . . rotation axis portion
67 . . . rotation actuator
67a . . . output shaft
B . . . proximal end side link hub central axis
C . . . distal end side link hub central axis
O . . . midpoint
P1 . . . proximal end side spherical link center
P2 . . . distal end side spherical link center
Q1 . . . proximal end side line member holding point
Q2 . . . distal end side line member holding point

What is claimed is:

1. A link actuation device comprising:
a proximal end side link hub; a distal end side link hub; and three or more link mechanisms which connect the distal end side link hub to the proximal end side link hub such that alteration in posture of the distal end side link hub is allowed,
wherein each of the link mechanisms includes: a proximal side end link member, one end of the proximal side end link member being rotatably connected to the proximal end side link hub; a distal side end link member, one end of the distal side end link member being rotatably connected to the distal end side link hub; and an intermediate link member whose two ends are rotatably connected to the other ends of the proximal side end link member and the distal side end link member, respectively,
wherein each of the link mechanisms has such a shape that a geometric model of the link mechanism depicted in straight lines shows symmetry between a proximal end side portion thereof and a distal end side portion thereof with respect to an intermediate portion of the intermediate link member,
wherein central axes of revolute pairs between the proximal end side link hub and the proximal side end links cross each other at a proximal end side spherical link center, and central axes of revolute pairs between the distal end side link hub and the distal side end links cross each other at a distal end side spherical link center,
wherein the link actuation device includes:
in a state where the proximal end side link hub and the distal end side link hub are parallel to each other,
a proximal end side link hub central axis being an axis that extends through the spherical link center of the proximal end side link hub toward the spherical link center of the distal end side link hub;
a distal end side link hub central axis being an axis that extends through the spherical link center of the distal end side link hub toward the spherical link center of the proximal end side link hub;
a proximal end side line member holding point which is on the proximal end side link hub central axis and which is located on a farther side from the distal end side spherical link center relative to the proximal end side spherical link center; and
a distal end side line member holding point which is on the distal end side link hub central axis and which is located on a farther side from the distal end side spherical link center relative to the proximal end side spherical link center,
wherein a line member is disposed between the proximal end side link hub and the distal end side link hub, two ends of the line member being held at the proximal end side line member holding point and the distal end side line member holding point,
wherein in a state where the proximal end side link hub and the distal end side link hub are parallel to each other, when a distance from a midpoint of the proximal end side spherical link center and the distal end side spherical link center to each of the spherical link centers is defined as D, and a distance from the proximal end side spherical link center to the proximal end side line member holding point and a distance from the distal end side spherical link center to the distal end side line member holding point are each defined as H, the relationship $$H = 0.5 \times D$$

is established.

2. The link actuation device as claimed in claim 1, wherein when a minimum bending radius of the line member is defined as Rmin, and a maximum bending angle of the distal end side link hub central axis relative to the proximal end side link hub central axis is defined as (2×θmax), the relationship $$R\text{min} = D \times (1/\sin \theta \text{max} + 1/(2 \times \tan \theta \text{max}))$$

is established.

3. The link actuation device as claimed in claim 1, wherein
the line member is an optical fiber.

4. The link actuation device as claimed in claim 1, wherein
the line member is a flexible shaft capable of transmitting torque, one end of the line member being connected to an output shaft of a rotation actuator installed in the proximal end side link hub, the other end of the line member being connected to a rotation axis portion of a rotatable mount which is rotatably installed on the distal end side link hub.

* * * * *